May 17, 1949.                C. A. BAUER ET AL                2,470,389
                    METHOD OF MAKING GRILLES FOR RADIO SETS
                              Filed April 1, 1946
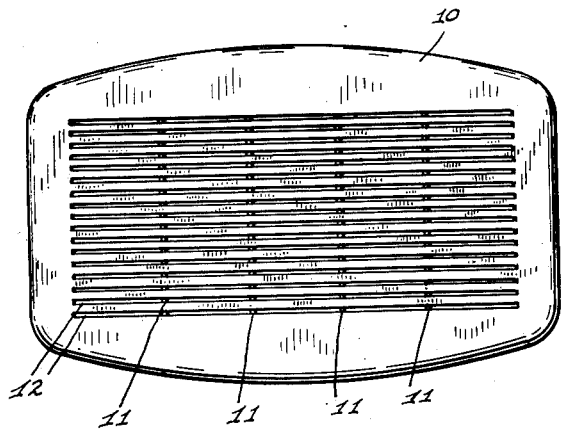
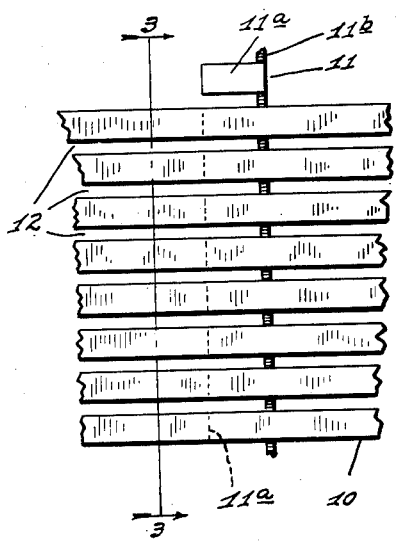
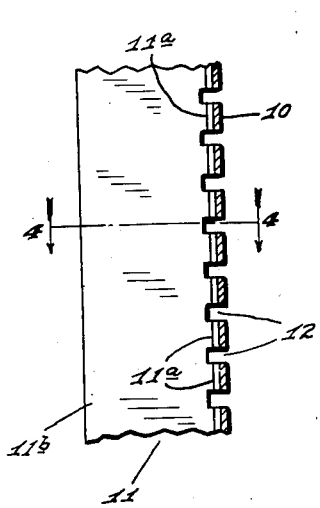
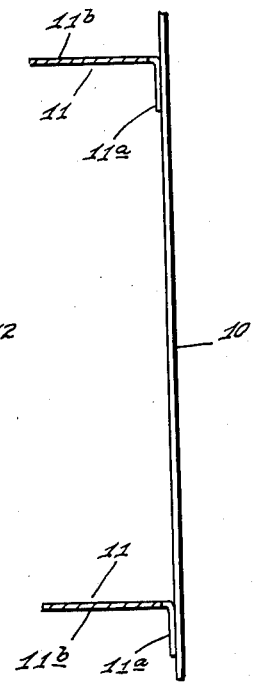
INVENTORS.
CHARLES A. BAUER and
WILLIAM A. BARNES,
BY
ATTORNEYS.

Patented May 17, 1949

2,470,389

UNITED STATES PATENT OFFICE 2,470,389

METHOD OF MAKING GRILLES FOR RADIO SETS

Charles A. Bauer, Newburg, Ind., and William A. Barnes, Utica, N. Y., assignors to Hoosier Cardinal Corporation, Evansville, Ind., a corporation of Indiana Application April 1, 1946, Serial No. 658,612

2 Claims. (Cl. 29—160)

Our invention relates to metal grilles and more particularly to metal grilles of the type used in association with the sound-emitting opening of a radio receiving set designed for use in automobiles. Such grilles must be perforate to permit the passage of the sound emitted by the loud speaker; but, at the same time, since they are usually mounted in a more or less exposed position, they should be relatively rigid in order to resist damage from accident. Such grilles are frequently mounted on the instrument board in a conspicuous position, and an attractive appearance is therefore usually desired.

It is the object of our invention to produce a grille which will possess sound-passing openings of an adequate aggregate area, which will also possess adequate strength and rigidity, and which will be pleasing in appearance. A further object of our invention is to produce a grille which will be light in weight and which can be simply and economically manufactured.

In carrying out our invention we form the grille of a plate of sheet-metal to the back surface of which there are secured one or more separate, parallel reinforcing members having flanges which extend rearwardly generally normal to the plate, and preferably also having flanges which lie against the rear surface of the plate. After the reinforcing members have been secured in place, the plate is sawed to provide a plurality of parallel kerfs extending completely through the plate and through the flanges of the reinforcing members.

The accompanying drawing illustrates our invention: Fig. 1 is a front elevation of a grille for an automobile radio receiving set; Fig. 2 is a fragmental plan view similar to Fig. 1 but on an enlarged scale; Fig. 3 is a vertical section on the line 3—3 of Fig. 2; and Fig. 4 is a horizontal section on the line 4—4 of Fig. 3.

The grille illustrated in the drawing comprises a sheet-metal plate 10 which may be of any desired shape. Usually, such a grille is shaped to fit in a grille-receiving opening in the instrument board of an automobile or in a casing enclosing the loud speaker of the radio receiving set. Our invention, however, is not concerned with the particular situation in which the grille is mounted or with the manner of its mounting.

To the rear face of the plate 10 we secure a plurality of reinforcing members, each of which, designated in its entirety by the reference numeral 11, comprises a flange 11a which lies against the back face of the plate 10 and a web 11b which extends generally normal to such plate.

After the reinforcing members have been secured in place, the place 10 and the flanges 11a are slotted, preferably by a metal saw, to form a multiplicity of parallel slots or kerfs 12 extending generally perpendicularly to the reinforcing members 11. The kerfs 12, as will be clear from Figs. 3 and 4, are deep enough to extend completely through the flanges 11a and into the webs 11b. As will be evident from Fig. 2, the only portion of the reinforcing members 11 visible through the slots 12 are the webs 11b, which show in edge elevation and consequently are relatively inconspicuous. Preferably, the slots 12 have a width approximately equal to, or at least no more than slightly greater than, the thickness of the webs 11b and of the plate 10. In such a grille, close inspection is necessary to see the webs 11b through the slots 12; and, when viewed from the front, the grille has substantially the same appearance as if the reinforcing members 11 were absent. Those members, however, still contribute greatly to the rigidity and strength of the grille and provide an adequate support for the narrow strips of metal which are left between the slots 12 in the plate 10.

To secure the maximum strength and rigidity, it is necessary that each of the segments into which each flange 11a is divided by the slots 12 be secured to the plate 10. Accordingly, it is highly desirable that the method employed in initially securing the reinforcing members 11 against the rear face of the plate 10 be such as will provide a bond which is substantially continuous throughout the longitudinal extent of each reinforcing member. Cementing, soldering, or brazing the reinforcing members in place is therefore preferable to spot-welding or to any other process which would form a discontinuous bond.

While we have shown the reinforcing members 11 as of L-shaped cross-section it is to be understood that other cross sections may be used if desired, so long as they can be secured to the back of the plate 10 and are so shaped that after the slots 12 have been cut only the edge of a thin web will be presented to view through such slots. Whatever the cross-sectional shape of the reinforcing members may be, they serve, both during the sawing operation and when the grille is in use, to stiffen and support the relatively weak strips left between the slots.

We claim as our invention:

1. The process of making a grille, comprising disposing on one face of a sheet-metal plate one or more metal reinforcing members each comprising a longitudinal flange and a web substantially normally thereto, securing the flanges of the reinforcing members to the plate, and then sawing the plate to provide a series of parallel slots transverse to the reinforcing members and extending through said plate and said flanges.

2. The process of making a grille, comprising disposing on one face of a sheet-metal plate one or more metal reinforcing members each comprising a thin web of materially greater width than thickness, securing the reinforcing members to the plate with said webs normal thereto, and then sawing the plate to provide a series of parallel slots transverse to the reinforcing members and extending through the plate to said web whereby only the edge of each web will be visible through the slots.

CHARLES A. BAUER.
WILLIAM A. BARNES.

REFERENCES CITED

The following references are of record in the file of this patent:

UNITED STATES PATENTS

| Number | Name | Date |
| --- | --- | --- |
| 1,723,311 | Stine | Aug. 6, 1929 |
| 1,988,728 | Green | Jan. 22, 1935 |
| 2,423,177 | Cunliffe | July 1, 1947 |